Patented Nov. 14, 1950

2,529,860

UNITED STATES PATENT OFFICE 2,529,860

2,8-DIAMINODIBENZOTHIOPHENE DIOXIDE AND N,N'-DERIVATIVES

Edward Delbert Amstutz, Bethlehem, Pa., assignor to The Wm. S. Merrell Company, Cincinnati, Ohio, a corporation of Delaware No Drawing. Application June 24, 1947, Serial No. 756,795

6 Claims. (Cl. 260—329.3)

This invention relates to a new class of chemical compounds including 2,8-diaminodibenzothiophene dioxide and certain of its 2,8-N,N' derivatives. This application represents a continuation of my application Serial No. 685,787, filed July 23, 1946.

The new compounds possess therapeutic properties and are characterized by the essential skeletal structure of 2,8-diaminodibenzothiophene dioxide as illustrated in its structural formula:

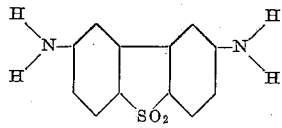

One or more hydrogens of the amino groups in this structure may be substituted by various modifying groups, including simple alkyl, simple acyl, and aldehyde addition products with bisulfites or sulfoxylates. The amino or substituted amino groups are positioned para in each ring with respect to the sulphone group. It should be noted that the substituted amino groups in each case are of the type that are readily convertible in the animal body to the free amino group, and it is believed that this is an essential factor in their physiological activity. One of the amino hydrogens, however, may be advantageously substituted by a nitrogen containing heterocycle, e. g., pyridyl, pyrimidyl, thiazyl.

In general, the new products are crystalline solids of relatively high melting point. 2.8-diaminodibenzothiophene dioxide is a yellow powder which may be further purified to almost colorless crystals, melting in the region of 329-331° C. and is insoluble in hydrochloric acid solutions over 10%. The general properties of the parent amino compound may be advantageously modified by the introduction of relatively non-toxic groups which are converted in vivo to the free amino. Simple alkyl amino derivatives of 2,8-diaminodibenzothiophene dioxide of similar characteristics may be prepared by substitution of lower alkyl radicals for the amino hydrogens, where the alkyl amino group is reducible in the animal body to the primary amino radical. The basic properties of the amino compounds may be altered by the substitution of acetyl groups. In this connection the simpler acyl amino derivatives may be considered the equivalents of the acetamido compounds. Compounds of improved solubility may be produced by introducing into the amino groups aldehyde bisulfite or aldehyde sulfoxylate addition products. Sodium formaldehyde sulfoxylate and sodium cinnamaldehyde bisulfite are typical of such addition products which, however, include other aldehyde addition products of relatively non-toxic nature, including those of sugars, e. g. sodium glucose sulfoxylate.

The introduction of a nitrogen base heterocyclic group into one of the amino groups may also be effected with advantage to produce compounds of additionally modified properties. The heterocyclic nucleus is ordinarily linked at the alpha carbon and the heterocycles available include both 5-membered and 6-membered rings containing one or more nitrogen atoms, such as pyrimidyl, pyridyl, pyrazolyl, triazolyl, piperazyl, thiazyl, etc. The nitrogen base heterocycle may also contain sulfur as in the case of the thiazyl radical.

The preparation of the new products will be illustrated in the examples below but the invention is not limited thereto. In general, the diaminodibenzothiophene dioxide derivatives are prepared by way of 2,8-diaminodibenzothiophene dioxide itself. This compound is prepared from dibenzothiophene by halogenation, oxidation and amination. The diacetamido compound is produced by refluxing with acetic anhydride, and the tetracetamido compound may be produced by the use of a large excess of acetic anhydride. The aldehyde salt derivatives are produced by reacting the diamino compounds with the appropriate aldehyde bisulfite or aldehyde sulfoxylate addition product.

The heterocyclic derivatives may be prepared in a step-wise process, using a mixed nitro-halogenodibenzothiophene as a starting material, through oxidation of the sulfide to the dioxide, reduction of the nitro group to yield the mixed amino-halogeno compound, condensation of the amino group with an α-halogenoheterocycle, and finally amination of the halogen group. For example, 2-bromo, 8-nitrodibenzothiophene is oxidized by a suitable oxidizing agent such as hydrogen peroxide and acetic acid solution, or chromic anhydride, to the corresponding dioxide. This compound is reduced by means of stannous chloride and hydrogen chloride in acetic acid solution to yield 2-bromo, 8-aminodibenzothiophene dioxide. A mixture of this compound with 2-bromopyridine, after slow heating on an oil bath, yields 2-bromo, 8-(N-2-pyridyl) aminodibenzothiophene dioxide, upon cooling, dilution with alcohol, collection, and purification. 2-Amino, 8-(N-2-pyridyl) aminodibenzothiophene dioxide is obtained by heating the mixed bromoheterocyclic amino compound with concentrated aqueous ammonia in the presence of a trace of copper powder in a heated tube at 170° to 225° C. for a period of about 20 hours.

EXAMPLE NO. 1

2,8-diaminodibenzothiophene dioxide

This compound is conveniently prepared in a three-step process as follows:

(a) 2,8-dibromodibenzothiophene

Dibenzothiophene (0.054 mole) is treated with bromine (0.11 mole) in carbon disulfide. After refluxing on a steam bath for 9 days, the carbon disulfide is removed by distillation at about 60° C. The residue is washed with water and recrystallized from acetic acid followed by a second recrystallization from acetic anhydride.

The bromination using the same quantity of reactants may be effected in glacial acetic acid in about 8 hours, but the product is difficult to purify.

(b) 2,8-dibromodibenzothiophene dioxide

A suspension of 2,8-dibromodibenzothiophene (0.02 mole) in glacial acetic acid (77 ml.) is oxidized with 30% hydrogen peroxide (9.6 ml.) by refluxing for 2 hours. The product is obtained in high yield upon cooling and filtering. It melts at 341.0–343.5° C.

(c) 2,8-diaminodibenzothiophene dioxide

A mixture of 21.5 g. of 2,8-dibromodibenzothiophene dioxide (0.0585 mole), about 150 ml. of concentrated aqueous ammonia, and about 1 g. of copper-bronze are heated together for approximately 8 hours at 200 to 220° C. The crude solid diamino compound is thus obtained, m. p. 317 to 326° C. Recrystallization from water with the aid of Norit (decolorizing charcoal) yields almost colorless crystals, m. p. 329 to 331° C. (decomp.)

EXAMPLE NO. 2

Sodium 2,8-diaminodibenzothiophene dioxide bis-formaldehydesulfoxylate

A mixture of 2,8-diaminodibenzothiophene dioxide (0.0032 mole) and recrystallized sodium formaldehydesulfoxylate (0.0062 mole) in a solution of 99.5% methanol (2 ml.) and absolute alcohol (40 ml.) is refluxed for 6 hours. The precipitate is removed from the cooled reaction mixture by filtration, washed twice with acetone and dried in vacuo over phosphoric anhydride. The product is soluble in water and melts at 267.5 to 278.5° C.

I claim:

1. 2,8-N,N'-derivatives of diaminodibenzothiophene dioxide represented by the type formula:

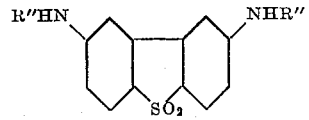

in which R'' is an aldehyde sulfoxylate residue.

2. Sodium 2,8-diaminodibenzothiophene dioxide bis-formaldehyde sulfoxylate.

3. 2,8-diaminodibenzothiophene dioxide.

4. Compounds of the formula

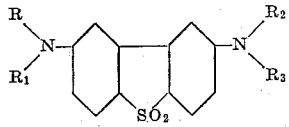

in which R, $R_1$, $R_2$ and $R_3$ are selected from the group consisting of hydrogen, acetyl, aldehyde-bisulfite, aldehyde-sulfoxalate and nitrogen-containing 5- and 6-membered heterocyclic groups, with the proviso that not more than one of the groups R, $R_1$, $R_2$ and $R_3$ is an N-heterocyclic group.

5. Aldehyde-bisulfite N-substituted 2,8-diaminodibenzothiophene dioxide.

6. Aldehyde-sulfoxylate N-substituted 2,8-diaminodibenzothiophene dioxide.

EDWARD DELBERT AMSTUTZ.

REFERENCES CITED

The following references are of record in the file of this patent:

UNITED STATES PATENTS

| Number | Name | Date |
|---|---|---|
| 2,149,335 | Dahlen | Mar. 7, 1939 |